United States Patent [19]

Hamada et al.

[11] Patent Number: 5,751,924
[45] Date of Patent: May 12, 1998

[54] MULTIPLE OVERLAY PRINTING AND OUTPUTTING DEVICE AND MULTIPLE OVERLAY PRINTING SYSTEM

[75] Inventors: Takao Hamada; Takehiro Matsushita; Tizou Shirakata; Yoshio Shiromoto; Hiroki Watanabe, all of Kawasaki, Japan

[73] Assignee: Fujitsu Limited, Kawasaki, Japan

[21] Appl. No.: 803,919

[22] Filed: Feb. 26, 1997

Related U.S. Application Data

[63] Continuation of Ser. No. 293,894, Aug. 22, 1994, abandoned.

[30] Foreign Application Priority Data

Oct. 14, 1993 [JP] Japan ................................ 5-257331

[51] Int. Cl.⁶ ........................................... G06F 15/00
[52] U.S. Cl. ................................... 395/115; 395/117
[58] Field of Search ................................ 395/115, 114, 395/117, 101, 112, 110, 111

[56] References Cited

U.S. PATENT DOCUMENTS

| | | | |
|---|---|---|---|
| 5,095,447 | 3/1992 | Manns et al. | 395/161 |
| 5,215,396 | 6/1993 | Rogers | 400/718 |
| 5,467,441 | 11/1995 | Stone et al. | 395/133 |
| 5,495,581 | 2/1996 | Tsai | 395/154 |

*Primary Examiner*—Raymond J. Bayerl
*Assistant Examiner*—Steven P. Sax
*Attorney, Agent, or Firm*—Armstrong, Westerman, Hattori, McLeland & Naughton

[57] ABSTRACT

An overlay printing technique for use with a printing device is disclosed which enables multiple overlays to be defined for each the print page. Overlay data, overlay position information and overlay scale information for each of the overlays set up by an overlay set-up unit are transferred to an overlay storage unit by overlay transferring unit. Print processing unit expands overlay data stored in the overlay storage unit according to corresponding overlay position information and overlay scale information and prints the expanded data and print data obtained by expanding general print data for each print page. One or more overlays are placed in any positions within one print page which are determined by overlay position information and overlay scale information. For multiple-frame printing, a multiple-frame processing unit translates overlay position information and overlay scale information so that each overlay fits in a corresponding frame.

25 Claims, 19 Drawing Sheets

```
OVL a START
    (x₁, y₁, x₂, y₁, l₁)
    (x₁, y₁, x₁, y₂, l₂)
    (x₂, y₁, x₂, y₂, l₃)
    (x₁, y₂, x₂, y₂, l₄)
OVL a END
```

5,751,924

MULTIPLE OVERLAY PRINTING AND OUTPUTTING DEVICE AND MULTIPLE OVERLAY PRINTING SYSTEM

This application is a continuation of application Ser. No. 08/293,894 filed Aug. 22, 1994, now abandoned.

BACKGROUND OF THE INVENTION

1. Field of the Invention

The present invention relates to a multiple-overlay printing technique for use with a printing device.

2. Description of the Related Art

An overlay feature is a technique for entering previously produced print data into an overlay memory in a printer as an overlay and, at print execution time, printing this overlay over usual print data (hereinafter referred to as general print data) loaded into a data memory from a host device, such as a computer system, for carrying out a printing application.

That is, as shown in FIG. 1, an overlay 102 representing ruled lines forming a table is created by the host device and then transferred to an overlay memory 101 in a printing device. On the other hand, general print data 104 representing each item of the table is transferred from the host device to a data memory 103 in the printing device. At print execution time, the overlay 102 held in the overlay memory 101 and the general print data 104 fed into the data memory 103 are sequentially expanded in an output memory 105 as print data 106 representing a bit-mapped image and then printed on a cut sheet. As the printing device use may be made of a laser printer, a liquid-crystal printer, an ink jet printer, or the like.

If a plurality of tables are to be printed which are identical in table ruling but differ only in item value, the use of the above-described overlay feature will eliminate the need for transferring data on table ruling from the host device to the printing device for each table, reducing printing time.

Heretofore, one overlay is created for each page to be printed. The page is always made to correspond one for one with an overlay. Thus, only one overlay can be output to one page to be printed.

Even if, therefore, an entire overlay within one page can be represented by a combination of several overlays as shown in FIG. 2, the entire intricate shape after combination must be defined as an overlay. For this reason, a problem arises in that an overlay cannot be designed efficiently as a combination of overlay parts.

Moreover, suppose that, as shown in FIGS. 3A, 3B and 3C, three types of overlays A, A' and A" are used for printing. In this case, the overlay A is identical to A' in shape except for a portion marked o, while the overlay A" is identical in shape to A except for a portion marked Δ. In the prior art, however, the overlays A, A' and A" have to be entered separately into the overlay memory in the printing device. That is, even if the shape varies only partly among overlays, each of the overlays has to be defined separately, including portions identical in shape. This will increase the amount of overlay data to be transferred from the host device to the printing device, which increases the time required for transferring overlay data and requires large storage capacity for the overlay memory.

Furthermore, suppose that, as shown in FIG. 4A or FIG. 4B, one page (physical page) of print paper is divided into a plurality of logical pages (frames) and each frame is printed with data for the corresponding respective logical page. In this case, overlays are needed each of which corresponds with a respective one of frames, i.e., logical pages. In the prior art, however, one overlay must be created for each physical page. Therefore, in the case of FIG. 4A, an overlay E must be created so as to accommodate two frames, and, in the case of FIG. 4B, an overlay F must be created which accommodates four frames. That is, for multiple-frame printing, the definition of an overlay is very complex.

SUMMARY OF THE INVENTION

It is accordingly an object of the present invention to enable multiple overlays to be defined for one print page.

According to the present invention, there are provided a multiple-overlay printing device, a multiple-overlay outputting device and a multiple-overlay printing system each of which permits an entire overlay within one page to be defined as a combination of several overlays for printing.

The multiple-overlay printing device includes overlay storage unit and print processing unit. The overlay storage unit stores overlay data, overlay position information and overlay scale information for each overlay. The overlay data is data needed to define the shape of an overlay, including how to draw ruled lines. The overlay position information indicates place where an overlay is to be printed. The overlay scale information is information which, when it is desired to print an overlay to a scale different from its original scale, is used to expand or develop data or information associated with that overlay to meet the desired scale. The print processing unit expands information entered for each page, i.e., overlay data, overlay position information, and overlay scale information, and general print data, i.e., print data other than overlay information and prints based on the resulting data. An overlay defined by a plurality of overlays is compounded as a single overlay when data is processed by the print processing unit. The overlay position information and overlay scale information may be entered into the print processing unit from the overlay storage unit or directly from an external host device.

The multiple-overlay outputting device includes an overlay set-up unit, an overlay transfer unit, and a print overlay specifying unit or may further include a multiple-frame processing unit. The overlay set-up unit sets up overlay data, overlay position information, and overlay scale information. The overlay outputting unit outputs overlay data, overlay position information and overlay scale information set up by the overlay set-up unit. When the multiple-frame processing unit is included, data or information set up by the overlay set-up unit is processed by the multiple-frame processing unit, then entered into the overlay transfer unit.

The print overlay specifying unit specifies one or more overlays to be printed and outputs signals to specify overlay position information and overlay scale information set up by the overlay set-up unit or processed by the multiple-frame processing unit if it is included. When a print page is split into multiple logical pages (frames) and its format is set, the multiple-frame processing unit translates overlay position information and overlay scale information according to the settings.

By using the multiple-overlay printing device and the multiple-overlay outputting device, a multiple-overlay printing system can be made up. To this end, a normal printing system includes a host device and a printer device has only to be modified such that the host device has the feature of the multiple-overlay outputting device built in and the printer device has the feature of the multiple-overlay printing device built in.

According to the present invention, an overlay itself is defined and stored independently of other general print data, which differs from the prior art in which an overlay is defined for each page. Thus, the present invention avoids the need to transfer the same overlay data anew when the same overlay is used. Moreover, if, when overlays that are slightly different are used, a common portion and different portions are set up and stored separately, they can be combined later for printing because the print processing unit generates processed data by appropriately combining a plurality of overlays. Furthermore, it is also possible to reduce an overlay already defined and use it for a corresponding one of logical pages into which a print page is split.

BRIEF DESCRIPTION OF THE DRAWINGS

The foregoing aspects and other features of the invention will be described in the following description in connection with the accompanying drawings, in which.

DETAILED DESCRIPTION OF THE PREFERRED EMBODIMENT

The present invention is directed to a printing system for overprinting overlay data and general print data other than the overlay data on top of each other.

Figure 5:
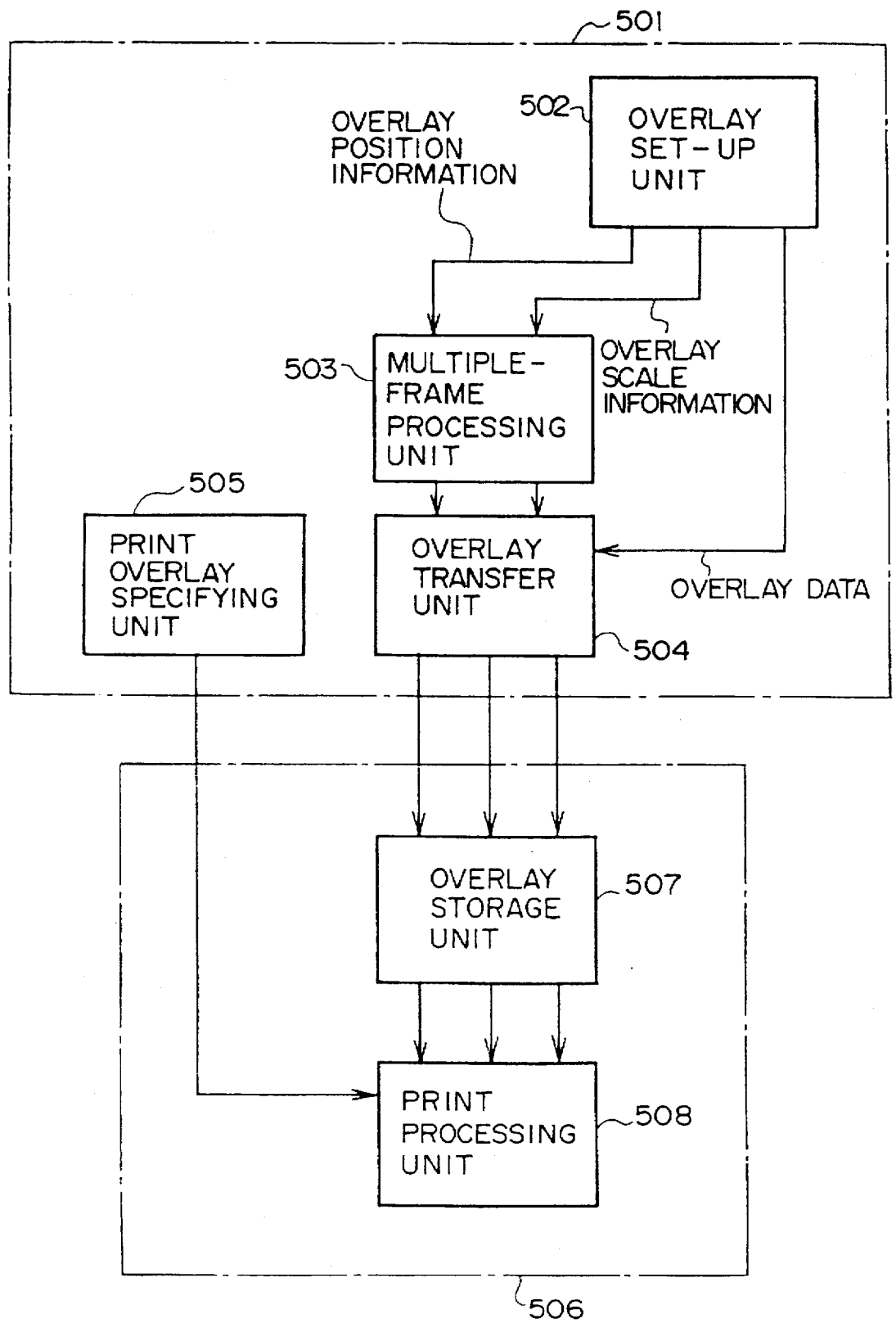
FIG. 5 is a basic block diagram of an multiple overlay printing system of the present invention.

Referring now to FIG. 5, there is illustrated a basic block diagram of the printing system according to the present invention. A host device 501, which is a computer system including at least a CPU (central processing unit), a main storage device, an auxiliary storage device, and a printer interface and carries out a given printing application, is equipped with an overlay set-up unit 502, a multiple-frame processing unit 503, an overlay transferring unit 504, and a print overlay specifying unit 505.

Figure 6:
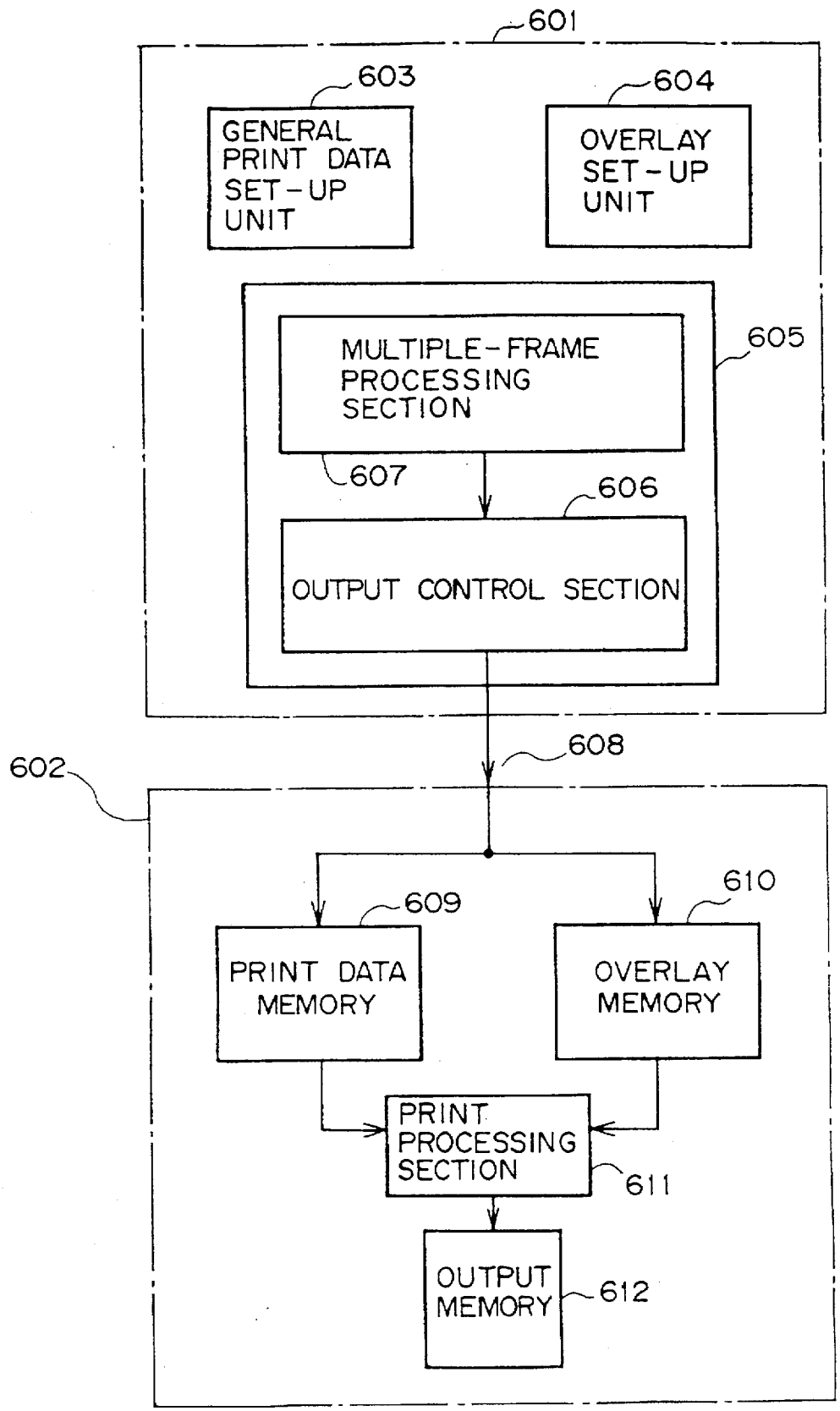
FIG. 6 is a block diagram of an embodiment of the multiple overlay printing system of the present invention.

The overlay set-up unit 502, which corresponds to an overlay set-up section 604 of FIG. 6, sets, for each of one or more overlays, overlay data indicating its print elements (corresponding to vector data indicating coordinates of the respective ends of line elements constructing the print elements), overlay position information indicating its printing position (corresponding to its starting and end coordinates), and overlay scale information indicating its scale (corresponding to a scale of enlargement/reduction).

In this case, a single overlay need not necessarily be set-up for one print page. That is, a user is allowed to set multiple overlays in any desired positions on a print page and to set overlay position information and overlay scale information for each overlay.

The multiple-frame processing unit 503 (corresponding to a multiple-frame processing section 607 of FIG. 6), when the format as to how one page is split into multiple frames is set, translates overlay position information and overlay scale information for each of overlays set up by the overlay set-up unit 502 in accordance with the settings.

The overlay transferring unit 504, which corresponds to an output control section 606 of FIG. 6, transfers overlay data for one or more overlays set up by the overlay set-up unit 502, and overlay position and scale information for those overlays or translated overlay position and scale information by the multiple-frame processing unit 503 for those overlays to a printing device 506.

The print overlay specifying unit 505, which corresponds to an output control section 606 of FIG. 6, specifies one or more overlays to be printed to the printing device 506 for each print page (physical page) at print execution time.

The printing device 506 includes an overlay storage unit 507 and a printing unit 508.

The overlay storage unit 507, which corresponds to an overlay memory 610 and print data memory 609 of FIG. 6, stores overlay data, overlay position information, and overlay scale information for each of one or more overlays, which are all transferred from the overlay transferring unit 504.

The printing unit 508, which corresponds to a printing section 611 of FIG. 6, expands overlay data stored in the overlay storage unit 507 for each of one or more overlays specified by the print overlay specifying unit 505 in accordance with the corresponding overlay position and scale information stored in the overlay storage unit 507 and carries out printing of the expanded overlay data and expanded general print data. The arrangement of FIG. 5 thus permits one or more overlays to be placed in any positions within one print page which are determined by overlay position and scale information.

If there is no need to print multiple frames, then the multiple-frame processing unit 503 will not be needed. Moreover, the overlay scale information is also not necessarily needed. Furthermore, all of the overlay data, the overlay position information and the overlay scale information need not necessarily be stored in the overlay storage unit 507. That is, the arrangement may be modified such that the overlay storage unit 507 stores only overlay data, and the print overlay specifying unit 505 specifies overlay position information and overlay scale information.

According to the present invention, if an entire overlay within one print page can be represented as a combination of several overlays, each of the overlays can be set up separately by the overlay set-up unit 502 for subsequent transfer to the printing device 506.

If necessary, the scale of a specific overlay can be changed according to overlay scale information and then combined with other overlays for subsequent transfer to the printing device 506.

If overlays have been transferred to the overlay storage unit 507 in the printing device 506, then the need for transferring overlay data from the host device 501 to the printing device 506 anew at print execution time will be eliminated. In this case, the print overlay specifying unit 505 simply transfers to the printing unit 508, as required, a control record in which overlay position and scale information for each overlay is specified and a control record in which a command to read that overlay from the overlay storage unit 507 is included. In response to this, the printing unit 508 reads the overlay data from the overlay storage unit 507, then changes the coordinates and scale associated with that data according to the overlay position and scale information, and expands the data to a bit-mapped format.

In addition, to set up several overlays which differ in shape only partly, it is necessary only that a basic overlay and other overlays for portions making a difference in shape be set up separately, then transferred to the printing device 506 in sequence. At print execution time, the printing unit 508 is permitted to combine these overlays appropriately for printing.

Thus, the host device 501 simply transfers to the printing device 506 only data on overlays needed as parts, permitting optimization of the data transfer time. Also, this ensures optimization of the storage capacity of the overlay storage unit 507.

At multiple-frame print execution time, on the other hand, the multiple-frame processing unit 503 translates overlay position and scale information for each of overlays set up by the overlay set-up unit 502 in accordance with multiple-frame settings. The resulting overlay position and scale information is transferred to the printing device 506 by the overlay transfer unit 504. In response to this, the printing unit 508 is permitted to make overlay printing corresponding to multiple-frame printing without making any changes to the original overlay data.

If overlays to be printed on the respective frames are identical, it is only required that data on one overlay and control records for the respective frames be transferred.

FIG. 6 is a block diagram of an embodiment of the present invention.

An application execution section 601, which is a host device for carrying out a given printing application, is implemented as a function executed by a computer system including at least a CPU, a main storage device, an auxiliary storage device, and a printer interface.

A printer section 602 is, for example, a laser printer.

In the application execution section 601, a general print data producing section 603 produces general print data other than overlay data, such as character data, as instructed by the user. This section 603 is implemented as a function of an existing word processing application.

Figure 1:
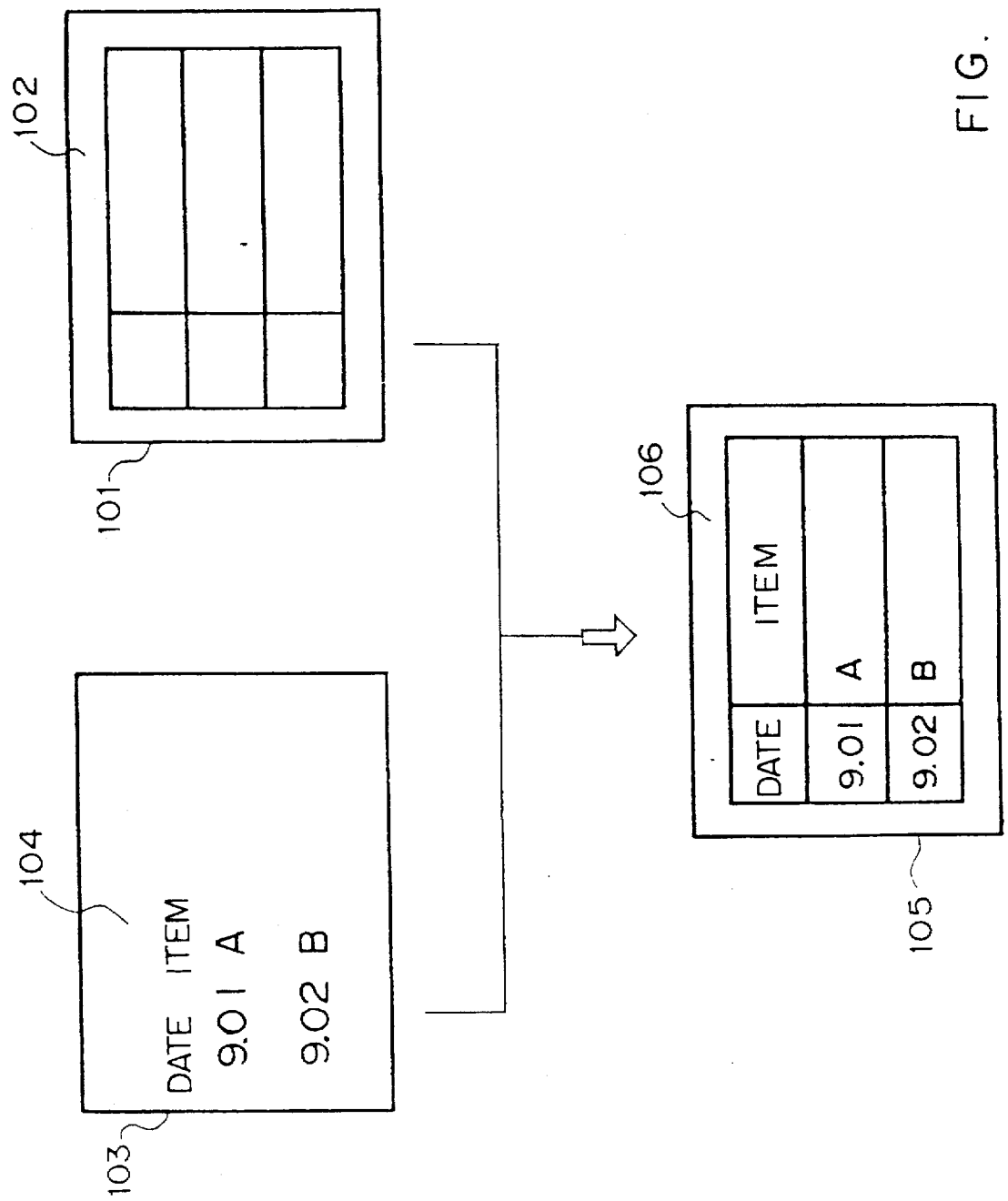
FIG. 1 shows an example of an overlay.
Figure 2:
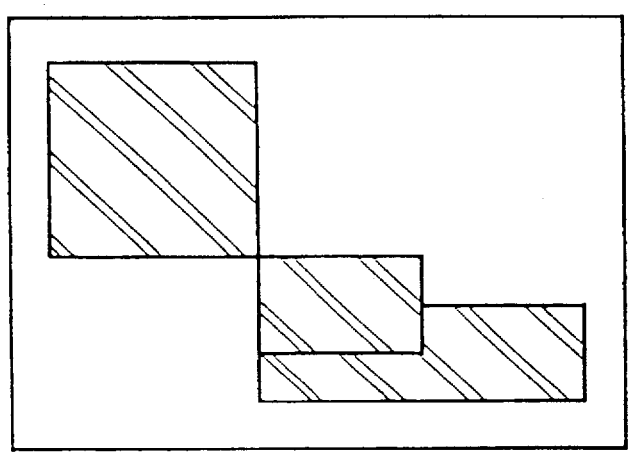
FIG. 2 is a diagram for use in explaining a problem associated with the prior art.
Figure 3A:
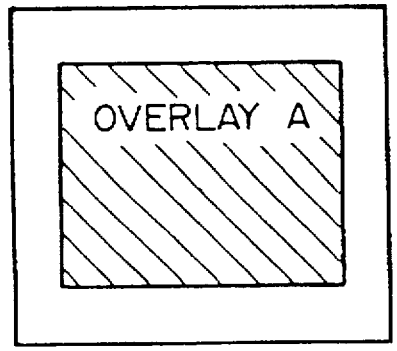
FIGS. 3A, 3B and 3C are diagrams for use in explaining another problem associated with the prior art.
Figure 3B:
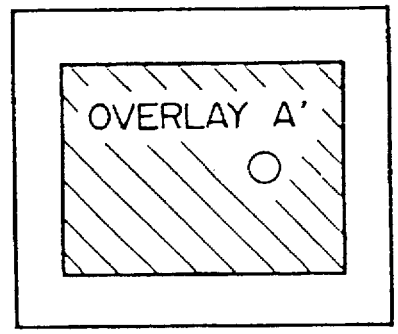
Figure 3C:
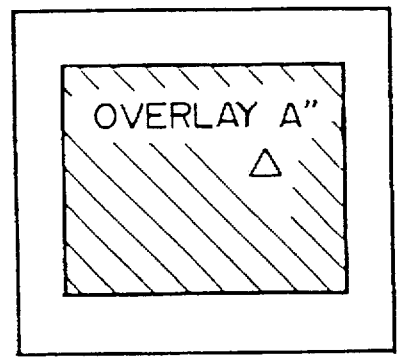
Figure 4A:
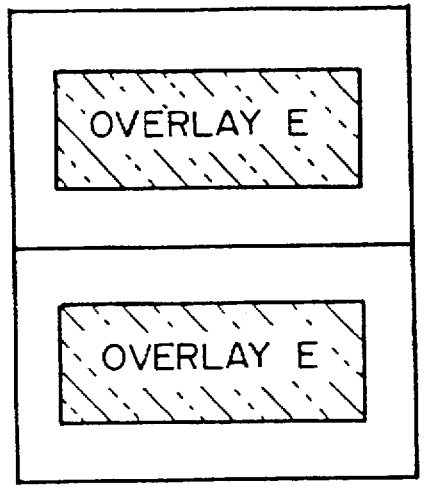
FIGS. 4A and 4B are diagrams for use in explaining still another problem associated with the prior art.
Figure 4B:
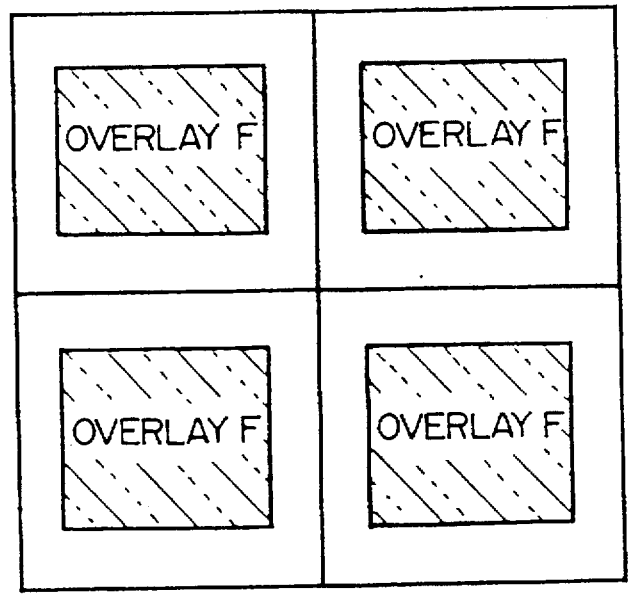

An overlay set-up section 604 defines an overlay using a macro of vector data as instructed by the user. Here, sets of vector data are defined which indicate the coordinate positions of the two ends of each of ruled lines forming the frame, rows and columns of a table, whereby an overlay indicating the ruled lines of the table is set up. As will be described later in connection with FIG. 3, the overlay set-up section 604 is permitted to set the starting coordinates, the ending coordinates, and the scale of enlargement/reduction of the whole of an overlay, which is an important feature of the present invention.

Figures 7A, 7B:
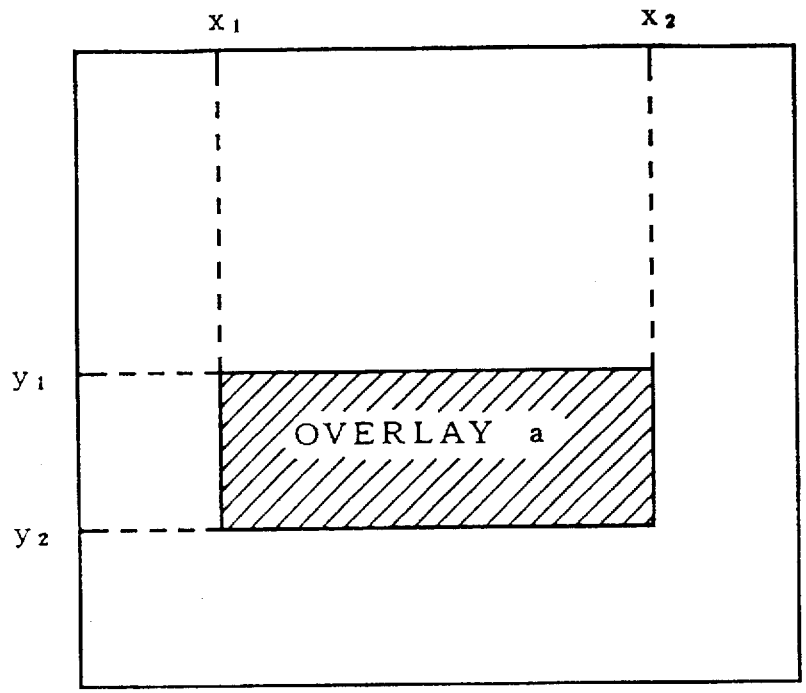
FIGS. 7A and 7B are diagrams for use in explanation of an example of a macro definition for an overlay by the overlay set-up section of FIG. 6.

FIGS. 7A and 7B show an example of a macro definition. In the figures, an overlay named "a" is formed of four lines connecting points having the coordinates $(x_1, y_1)$, $(x_2, y_1)$, $(x_2, y_2)$, and $(x_1, y_2)$. The overlay "a" is defined as a rectangular region which is shown in cross-hatching in FIG. 7A. In FIG. 7B, there is shown an example of a macro definition. In a set of definitions headed by "OVL a START" and ended by "OVL a END", the starting coordinates, the ending coordinates and the lengths between the starting and ending coordinates are indicated as a control record to describe the overlay "a". The lengths between the starting and ending coordinates refer to 11 through 14. In FIG. 7A, for example, $11=x_2-x_1$.

An print data output section 605 comprises an output control section 606 and a multiple-frame processing section 607 and, as instructed by the user, outputs general print data produced by the general print data producing section 603 and overlays defined by the overlay set-up section 604 to the printer section 602 as print data 608.

In the print data output section 605, the output control section 606 translates general print data and overlay data to print data 608 coded in a format interpretable by the printer section 602 and outputs them to the printer section.

When multiple-frame printing is specified by the user, the multiple-frame processing section 607 performs coordinate conversion and enlargement/reduction scale conversion on general print data and overlay data and outputs the resulting general print data and overlay data to the output control section 606.

The printer section 602 comprises a print data memory 609, an overlay data memory 610, a printing section 611, and an output memory 612. The print data memory 609 stores the print data 608 from the application execution section 601, the print data comprising the general print data and the overlay data. The overlay memory 610 stores the overlay data in the print data 608 from the application execution section 601.

With each transfer of print data 608 for one print page (hereinafter referred to as a physical page) from the application execution section 601 to the print data memory 609, the printing section 611 reads the print data 608 from the print data memory 609, then expands it to data in a bit-mapped format and stores the resulting data in the output memory 612. After that, a laser controller not shown is told to start printing. As a result, printing based on dot data in the bit-mapped format stored in the output memory 612 is carried out. If necessary, the printing section 611 reads one physical page of overlay data out of the overlay memory 610, then expands it to data in a bit-mapped format and stores it in the output memory 612.

Figure 8:
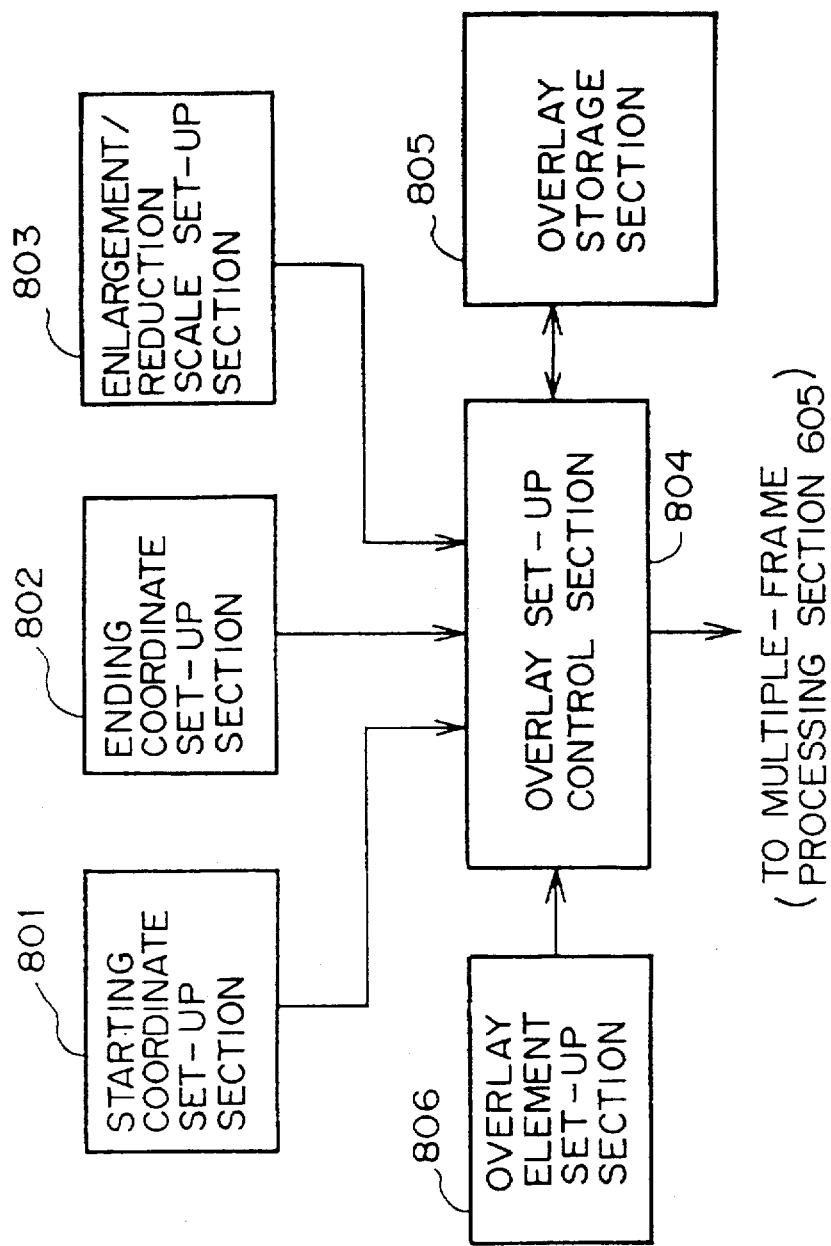
FIG. 8 is a block diagram of the overlay set-up section.

FIG. 8 is a block diagram of the overlay set-up section 604 of FIG. 6.

By defining sets of vector data representing coordinate positions of the two ends of a respective one of line elements forming a table using an overlay element set-up section 806, the user sets up an overlay indicating lines for the table. This set-up section is equipped with a graphical user interface, which allows the user to produce vector data in sequence through the operation of a cursor or mouse. The sets of vector data thus set are stored as components for one overlay in an overlay storage section 805 by the overlay set-up control section 804. The overlay storage section 805 is implemented by the main storage or disk storage.

Figure 12:
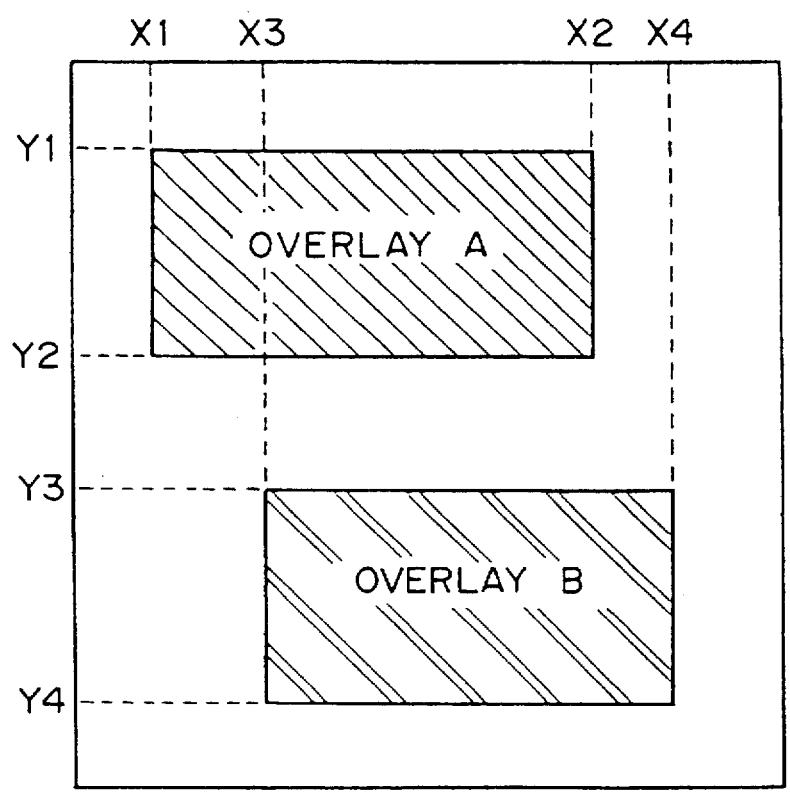
FIG. 12 is a diagram for use in explaining the operation of the overlay set-up section.

The user is allowed to set the starting and ending coordinates of an overlay currently being created through a starting coordinate set up section 801 and an ending coordinate set up section 802. For example, as shown in FIG. 12, the coordinates (X1, Y1) and the coordinates (X2, Y2) on physical page are respectively set up as the starting coordinates and the ending coordinates of an overlay A. For an overlay B, the coordinates (X3, Y3) and the coordinates (X4, Y4) are respectively set up as the starting coordinates and the ending coordinates. The starting coordinates and the ending coordinates thus set are stored in the overlay storage section 805 as part of a control record for the respective individual overlay.

If necessary, the user is allowed to set the scale of enlargement/reduction of the default of each overlay currently being set up by the use of an enlargement/reduction scale setting section 803. If no enlargement/reduction scale is set, then each overlay will have its enlargement/reduction scale set to 100% (unity). The enlargement/reduction scale thus set for each overlay is stored by the overlay set-up control section 804 in the overlay storage section 805 as part of a control record for the corresponding overlay.

A control record, in which the starting coordinates, the ending coordinates and the enlargement/reduction scale are included, has, for example, the following format:
(overlay identifier, starting coordinates, ending coordinates, enlargement/reduction scale)

It is not necessarily required to set up a single overlay per physical page. The user is thus allowed to set up a plurality of overlays in any positions within a physical page with the starting coordinates, the ending coordinates and the enlargement/reduction scale set for each overlay.

Figure 9:
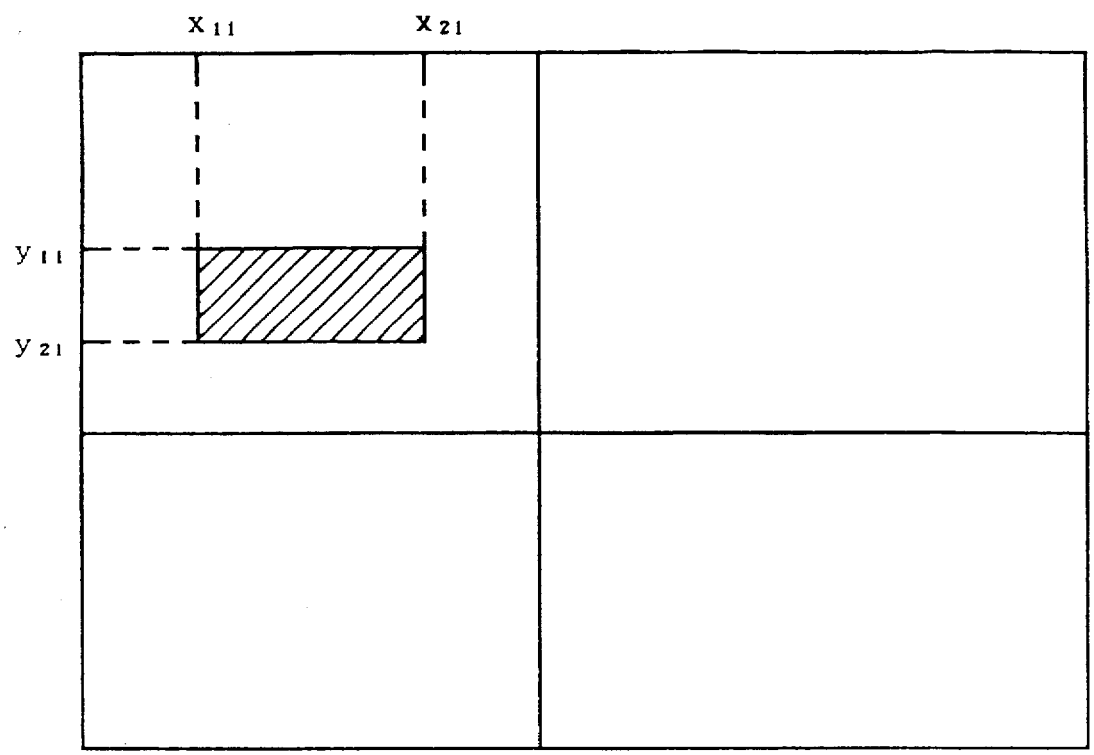
FIG. 9 is a diagram for use in explaining a control record.

If the overlay "a" shown in FIG. 7A is reduced to one fourth and printed as shown in FIG. 9, then the corresponding control record will be indicated by
(overlay a, $x_{11}$, $y_{11}$, $x_{21}$, $y_{21}$, 25)

Figure 10:
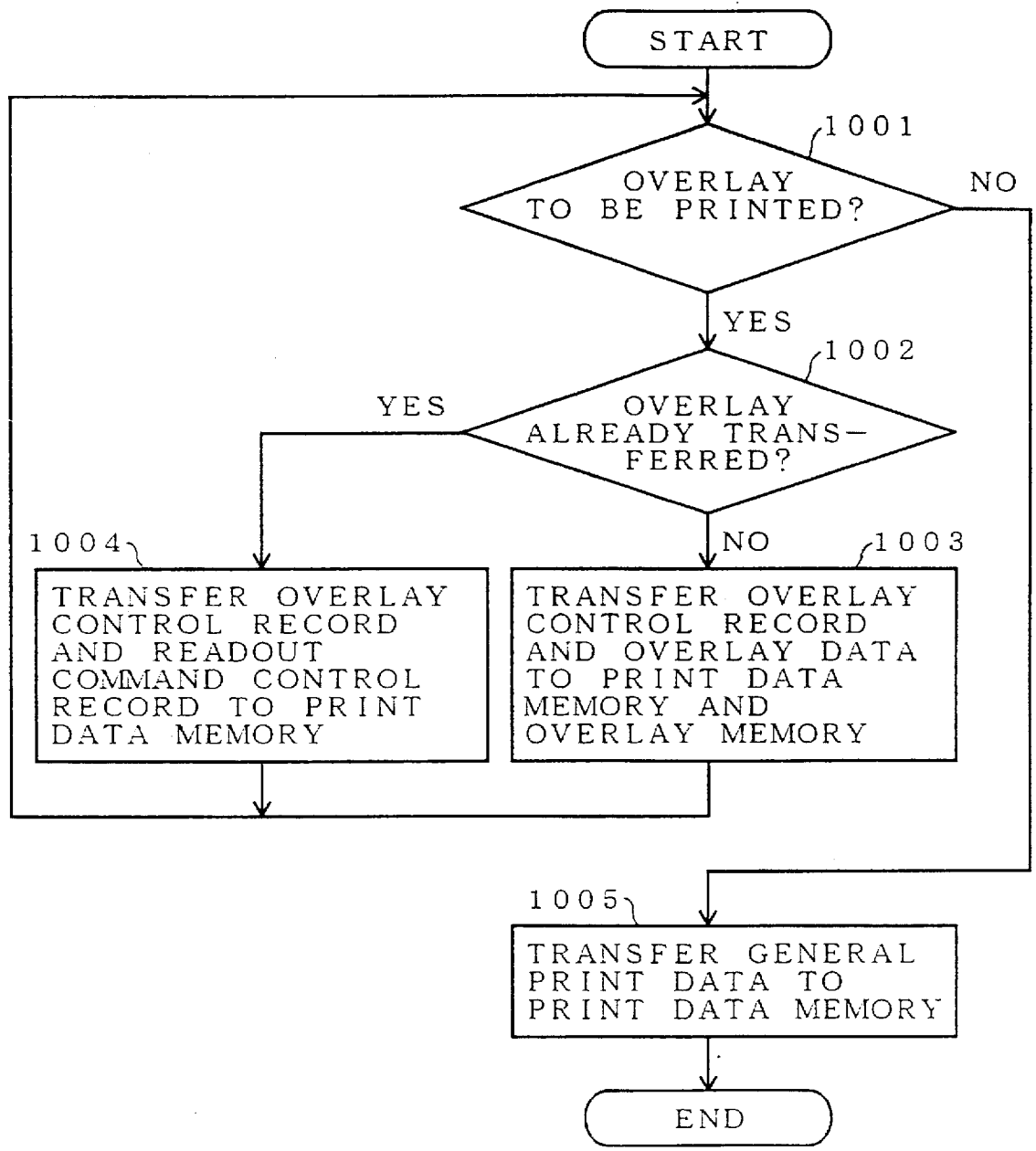
FIG. 10 is a flowchart illustrating the operation of the output control section of FIG. 6.

When printing is started by the user after general print data stored in disk storage not shown and an overlay stored in the overlay storage section 805 of FIG. 8 have been specified, the output control section 606 of FIG. 6 carries out the procedure shown by a flowchart of FIG. 10. This procedure is implemented by a printer driver program which is run on a CPU not shown.

In FIG. 10, a decision is first made in step 1001 as to whether or not a request for overlay printing has been made by the user. If the decision is NO, general print data specified by the user is read from storage not shown and transferred to the print data memory 609 in the printer section 602.

If, on the other hand, the decision in step 1001 is YES, a decision is next made in step 1002 as to whether or not an overlay specified by the user has been transferred to the overlay memory 610 in the printer section 602. If this decision is NO, the control record for the overlay specified by the user and overlay vector data are read from the overlay storage section 805 and transferred as print data 608 to the print data memory 609 and the overlay memory 610 in the printer section 602. When multiple-frame printing is specified by the user, a control record read from the overlay storage section 805 is output to the printer section 602 in step 1003 after translation in the multiple-frame processing section 607 (FIG. 6) as will be described later in connection with FIGS. 16A and B.

If, on the other hand, the decision in step 1002 is YES, in step 1004 a control record in which the starting coordinates, ending coordinates and enlargement/reduction scale of an overlay specified by the user are included and a control record in which a command to read that overlay from the overlay memory 610 is included are transferred as print data 608 to the print data memory 609 in the printer section 602. When multiple-frame printing is specified by the user, that record in which the overlay starting coordinates, ending coordinates and enlargement/reduction scale are specified, which has been read from the overlay storage section 805, is output to the printer section 602 in step 1004 after translation in the multiple-frame processing section 607.

After steps 1003 and 1004, the procedure returns to step 1001 to make a decision as to whether or not printing of another overlay has been specified by the user.

If, after one or more overlays have been output to the printer section 602 in this way, the decision in step 1001 indicates that no other overlay is specified to be printed, the procedure goes next to step 1005 in which general print data specified by the user is read from the storage not shown and transferred to the print data memory 609 in the printer section 602.

It is an important feature of the present invention that the output control section 606 permits a plurality of overlays to be contained within one of physical pages separated by page breaks.

Subsequently, the printing section 611 in the printer section 602 carries out the procedure shown in FIG. 11 when print data 608 is transferred from the application execution section 601 to the print data memory 609. This procedure is implemented by a given control program that is run on a CPU (not shown) which is built into the printer section 602.

Figure 11:
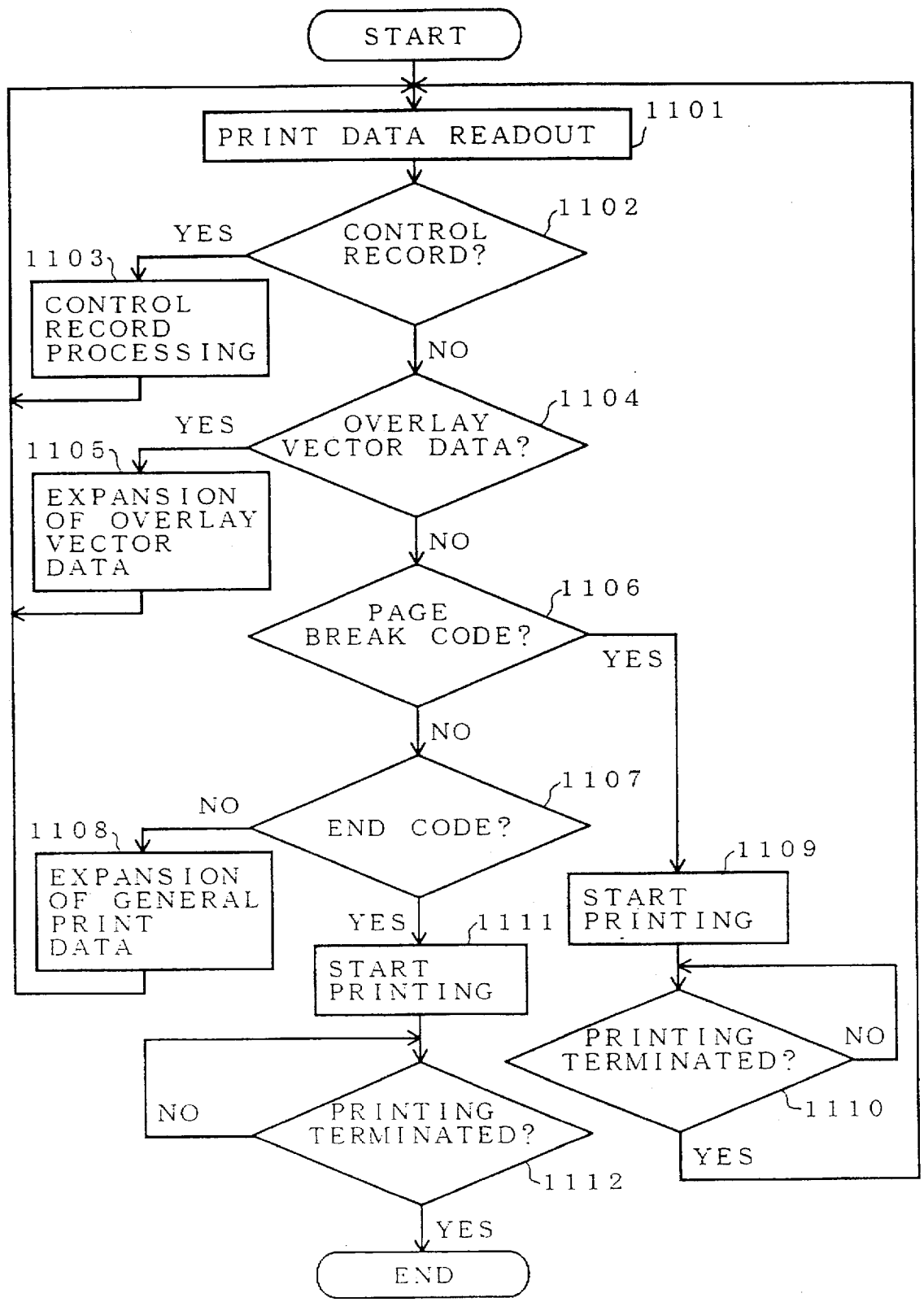
FIG. 11 is a flowchart illustrating the operation of the printing section of FIG. 6.

In FIG. 11, a set of print data is first read from the print data memory 609 in step 1101. In step 1102, a decision is next made as to whether or not the print data is a control record. This control record is an overlay control record described above or a control record in general print data.

If the decision in step 1102 is that the print data is a control record, then processing for that record is performed in step 1103. For example, for a control record which includes the starting coordinates, ending coordinates and enlargement/reduction scale for a specific overlay, processes of setting the starting coordinates indicating the origin of coordinates of vector data contained in that overlay which will be expanded later in step 1105 to be described later, setting the enlargement/reduction scale for the unit of the coordinate axes of that vector data, setting the effective range of the coordinates of that vector data, and so on, are carried out.

For a control record in which a command is included to read a specific overlay from the overlay memory 610, predetermined settings are made so that data for that overlay will be read later from the overlay memory 610 in step 1101. For a control record in general print data, processes of setting the print starting position of the general print data within a physical page, setting a font for the general print data, setting the character size for the general print data, and so on are carried out. In all the processes in step 1103 described above, a control record is translated to hardware code.

Upon completion of step 1103, the procedure returns to step 1101 in which new print data is read from the print data memory 609 or the overlay memory 610.

If the print data read in step 1101 is not a control record, that is, if the decision in step 1102 is NO, then a decision is made in step 1104 as to whether or not the print data is overlay vector data.

If the decision in step 1104 is YES, the overlay vector data is expanded to a bit-mapped format in step 1105. The resulting bit-mapped data is transferred to the output memory 612. To be specific, dot positions on straight lines defined by two sets of coordinate data composing vector data are computed, and a value 1 is loaded into bit addresses corresponding to those dot positions on the output memory 612. At this point, the vector data coordinates are represented by relative coordinates the origin of which is placed at the starting coordinates set by an overlay control record described above. Thus, the dot positions are computed after two sets of coordinate data composing vector data have been translated to coordinates on a physical page on the basis of the starting coordinates set in step 1103. If, at this point, an enlargement/reduction scale has been set in step 1103, then the scale of coordinates is changed according to that enlargement/reduction scale.

Upon completion of step 1105, the procedure returns to step 1101 in which new print data is read from the print data memory 609 or the overlay memory 610.

If the print data read in step 1101 is neither a control record nor overlay vector data, that is, if the decision is NO in both step 1102 and step 1104, then the procedure goes to steps 1106 and 1107 in which a decision is made as to whether or not the print data is a page break code or an end code.

If the decision is NO in both steps 1106 and 1107, then the print data, which is general print data, is expanded to a bit map in step 1108. The resulting bit map is transferred to the output memory 612. To be specific, vector data corresponding to a character code which is general print data is read from a vector font memory (not shown) built into the printer section 602, then expanded to a bit map in the same way as overlay vector data (step 1105).

Upon completion of step 1108, the procedure returns to step 1101, in which new print data is read from the print data memory 609 or the overlay memory 610.

If the print data read in step 1101 is general print data representing a page break code, that is, if the decision is YES in step 1106, then sufficient print data for one physical page of print paper will have been read into the output memory 612. In this case, the laser control device not shown is told to start printing one physical page of data which has been transformed into a bit map in the output memory 612 in step 1105 or 1108.

After that, the procedure goes to step 1110 in which the print processing section 611 stands by until the printing is terminated.

When the printing of one physical page of data is terminated, that is, when the decision in step 1110 indicates YES, step 1101 is carried out again, so that print data for a new physical page is read out of the print data memory 609 or the overlay memory 610. For the new print data, the procedure following step 1101 is carried out.

If the print data read in step 1101 is general print data indicating an end code, that is, if the decision in step 1107 is YES, then the print data for the last physical page will have been read into the output memory 612. Then, the laser control device is commanded to start printing the data for the last physical page which has been stored bit-mapped in the output memory 612 in step 1105 or 1108. After that, the print processing section 611 is placed in the wait state in step 1112 until the printing is terminated. When the printing of data for the last physical page is terminated, that is, when the decision in step 1112 indicates YES, the print processing section 611 terminates the print processing.

As can been seen from the foregoing, the present invention enables the output control section 606 to incorporate more than one overlay into one of physical pages separated by page breaks that are general print data and the print processing section 611 to expand more than one overlay within one physical page.

Figure 13:
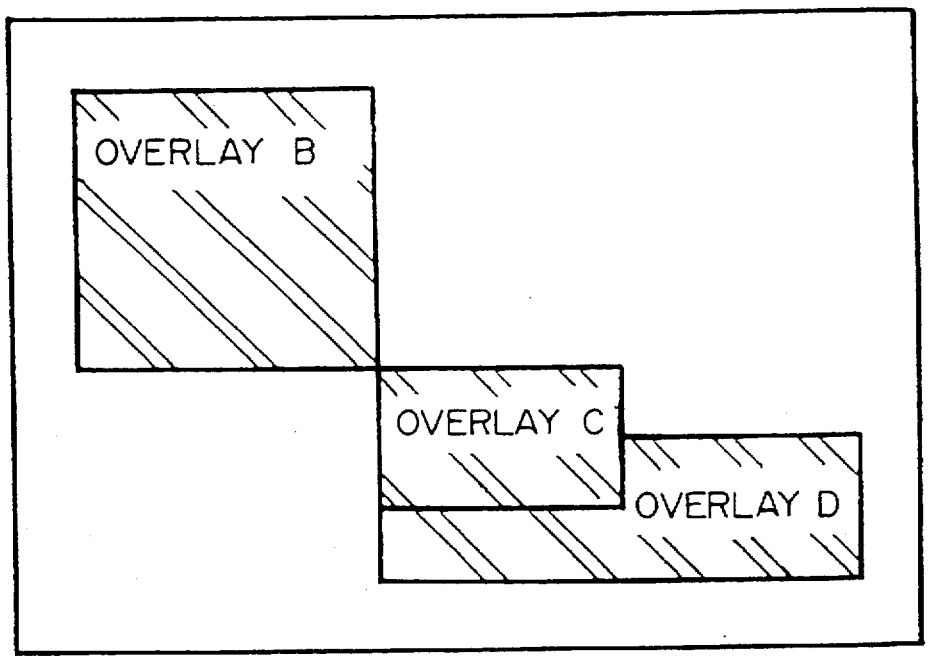
FIG. 13 is a diagram for use in explaining the operation when multiple overlays are output.

If, therefore, an overlay in one physical page is represented by a combination of several overlays as shown in FIG. 13, the overlay set-up section 604 is permitted to define each of the overlays B, C and D separately and to transfer them to the printer section 602.

In addition, if necessary, it is also permitted to change the enlargement/reduction scale for a specific overlay and combine that overlay with any other overlay for transfer to the printer section 602. In this case, if all the overlays have been transferred previously to the overlay memory 610 in the printer section 602, there is no need for transferring overlay data anew from the application execution section 601 to the printer section 602. It is only required to transfer a control record for each overlay in which its starting coordinates, ending coordinates and enlargement/reduction scale are specified and a control record for that overlay in which a command to read the overlay from the overlay memory 610 is included. The print processing section 611 simply reads overlay vector data from the overlay memory, then changes the starting coordinates, ending coordinates and enlargement/reduction scale for that vector data as required, and transforms the vector data into a bit map.

Figure 14A:
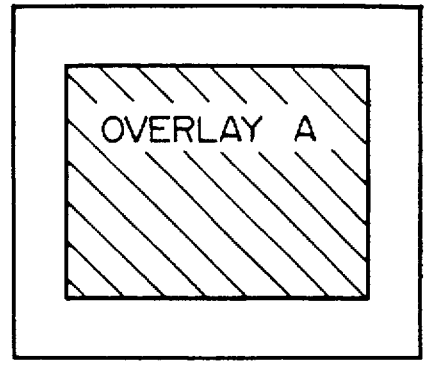
FIGS. 14A, 14B and 14C are diagrams for use in explaining the operation when multiple overlays are output.
Figure 14B:
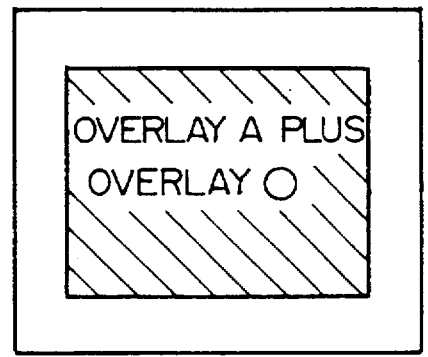
Figure 14C:
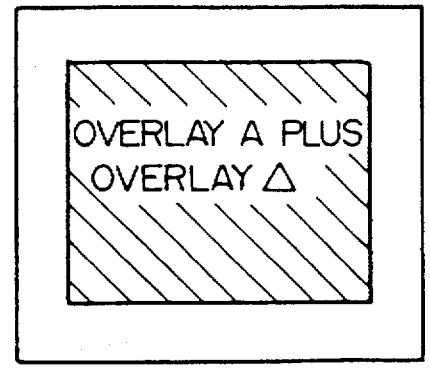

Furthermore, when it is desired to define three overlays that differ only in portions marked o and Δ as shown in FIGS. 14A, 14B and 14C, it is only required to define separately an overlay A, an overlay corresponding to only that portion marked o, and an overlay corresponding to only that portion marked Δ and transfer these overlays in sequence to the printer section 602. This permits the overlay A alone to be printed on the first physical page, the overlay A and the overlay for that portion marked o to be printed on the second physical page, and the overlay A and the overlay for that portion marked Δ to be printed on the third physical page. In this case, when the second and the third physical page are printed, there is no need for transferring the overlay A anew to the printer section 602. That is, the overlay A which has been already transferred to the overlay memory 610 for printing of the first physical page can be employed to print on the second and third physical pages.

Thus, the host device simply transfers only overlays required as parts to the printer device, permitting the overlay transfer time to be reduced. In addition, the storage capacity of the overlay memory 610 can be reduced.

Figure 15:
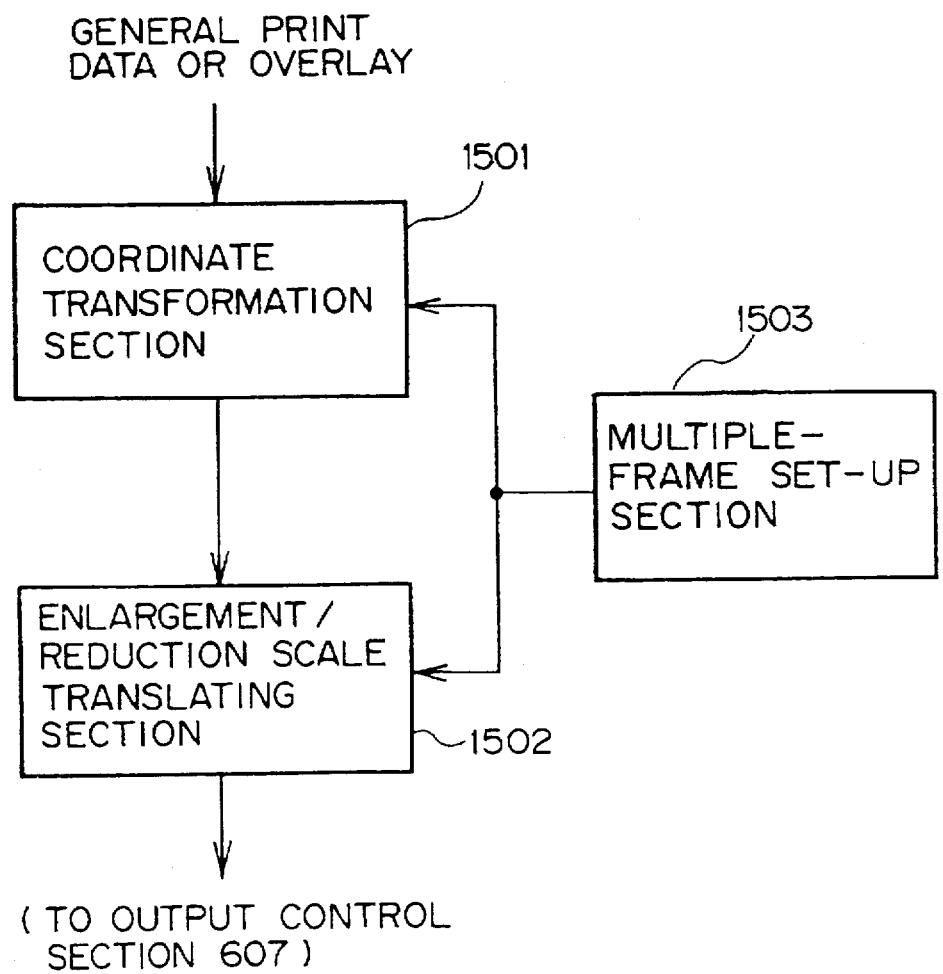
FIG. 15 is a block diagram of the multiple-frame processing section of FIG. 6.

Referring now to FIG. 15, there is illustrated, in block diagram form, the multiple-frame processing section 607 in the print data output section 605, which comprises a coordinate transformation section 1501, an enlargement/reduction scale translation section 1502, and a multiple-frame set-up section 1503.

Figures 16A, 16B:
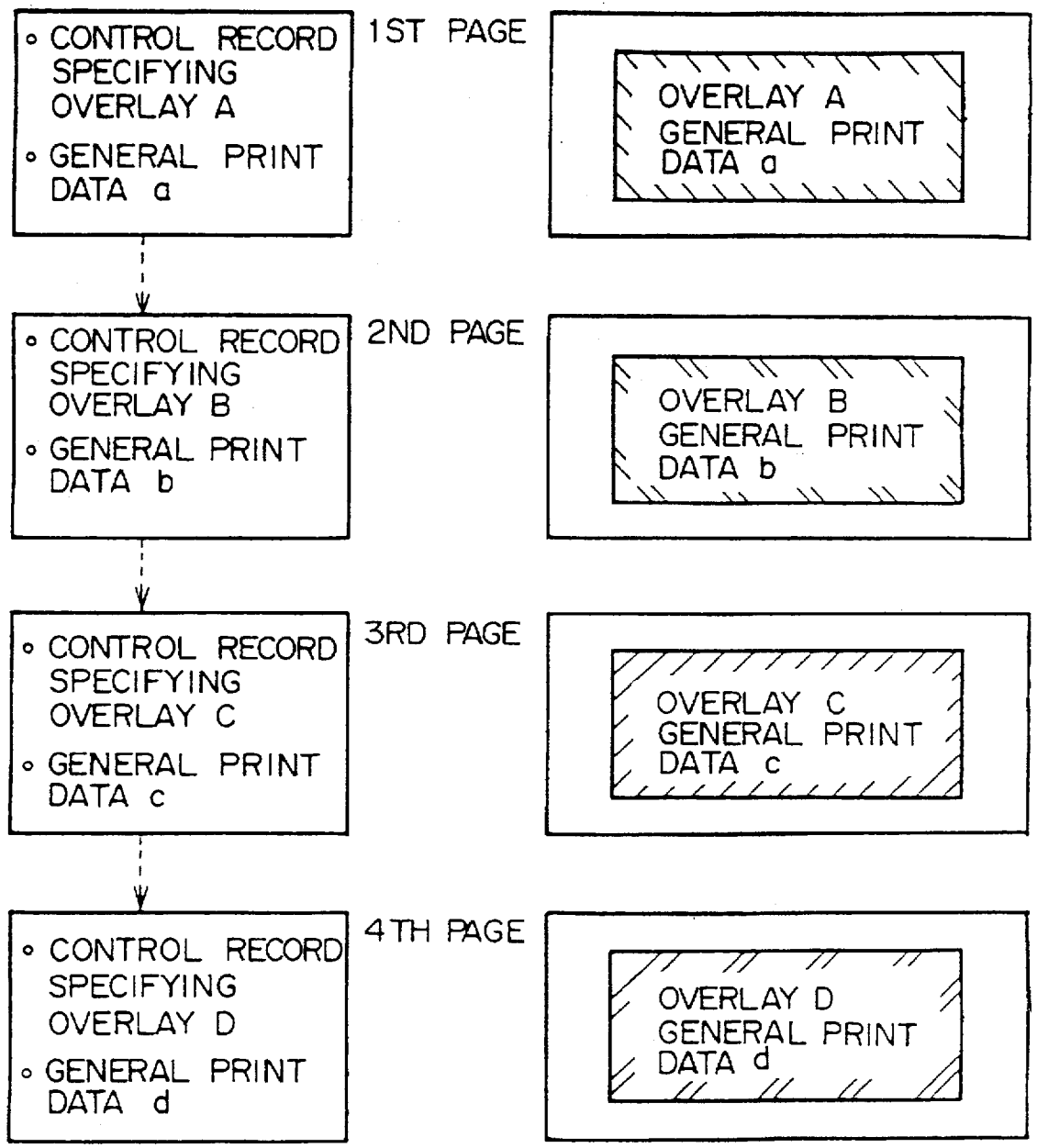
FIGS. 16A and 16B are diagrams for use in explaining the operation of the multiple-frame processing section.

Suppose now that, as shown in FIG. 16A, the user has created four physical pages of general print data a, b, c and d and four overlays A, B, C and D for the respective physical pages using the general print data set-up section 603 and the overlay set-up section 604. In this case, if printing of the four physical pages of general print data is carried out without specifying multiple-frame printing, then one overlay and corresponding general print data will be printed for each of the physical pages.

If the user wants multiple-frame printing, then he or she is prompted to set up a format as to how one physical page of print paper is to be split into logical pages (frames) using the multiple-frame set-up section 1503. For example, the user is allowed to set up a format so that one physical page will be split into four frames as shown in FIG. 17.

After that, the coordinate transformation section 1501 reads from the overlay storage section 805 (FIG. 8) each of the control records for the respective overlays A, B, C and D associated with the respective physical pages, in which their respective starting coordinates, ending coordinates and enlargement/reduction scales are included, then transforms the respective starting and ending coordinates. That is, the coordinate transformation section 1501 shifts the starting and ending coordinates so that the starting coordinates included in the control record for the overlay A associated with the first physical page coincide with the coordinates (x11, y11) on the physical page shown in FIG. 17. Likewise, the coordinate transformation section 1501 shifts the starting and ending coordinates included in the respective control records for the overlays B, C and D associated with the second, third and fourth respective physical pages so that their respective starting coordinates coincide with (x21, y21), (x31, y31) and (x41, y41) on the physical page shown in FIG. 17.

Next, the enlargement/reduction scale translation section 1502 changes the enlargement/reduction scale included in each of the control records for the respective overlays A, B, C, and D. That is, when the enlargement/reduction scale included in each of the control records is 100%, it is changed to 50% by the conversion section 502.

Figure 17:
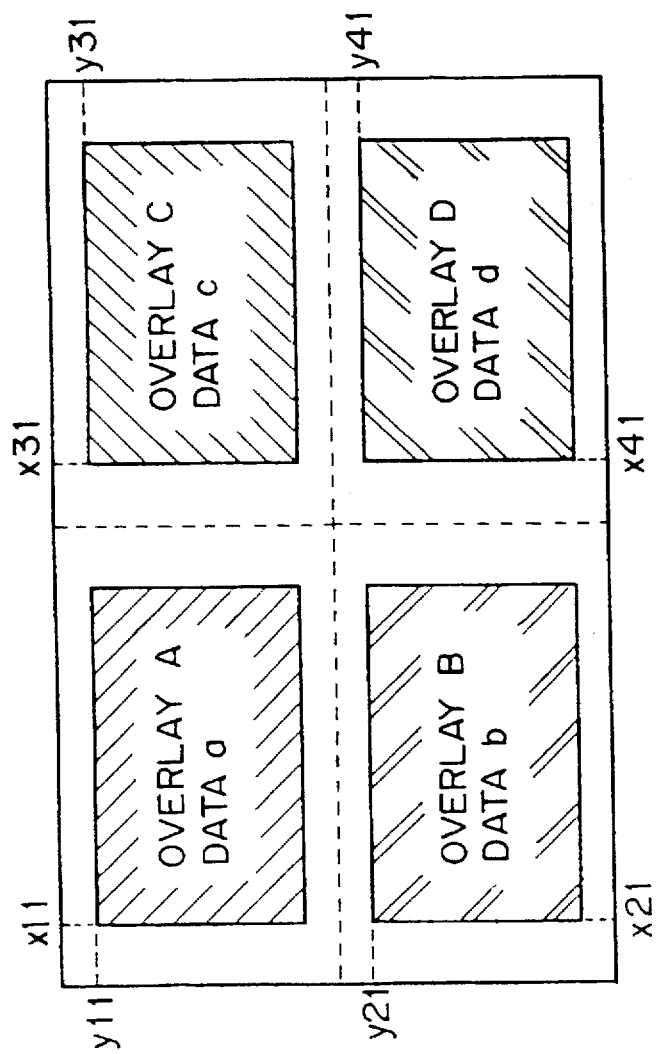
FIG. 17 is a diagram for use in explaining the operation of the multiple-frame processing section.

The control records with the shifted starting and ending coordinates and the changed enlargement/reduction scales are transferred by the output control section 606 and processed by the print processing section 611, permitting multiple-frame printing of overlays to be performed in such a manner as shown in FIG. 17 without making any changes to the original overlay vector data.

If, in this case, the overlays of the respective physical pages have been transferred previously to the overlay memory 610 in the printer section 602, there is no need of transferring overlay data anew from the application execution section 601 to the printer section 602. That is, it is only required to transfer control records which have undergone changes in the starting and ending coordinates and the enlargement/reduction scales of the respective overlays and control records including commands to read the corresponding individual overlays from the overlay memory 610. The print processing section 611 simply reads vector data of the respective overlays from the overlay memory, then changes the starting and ending coordinates and the enlargement/reduction scales for the vector data to meet the changes in the corresponding records made by the multiple-frame processing section 607 and transforms the vector data into a bit map.

Figure 18A:
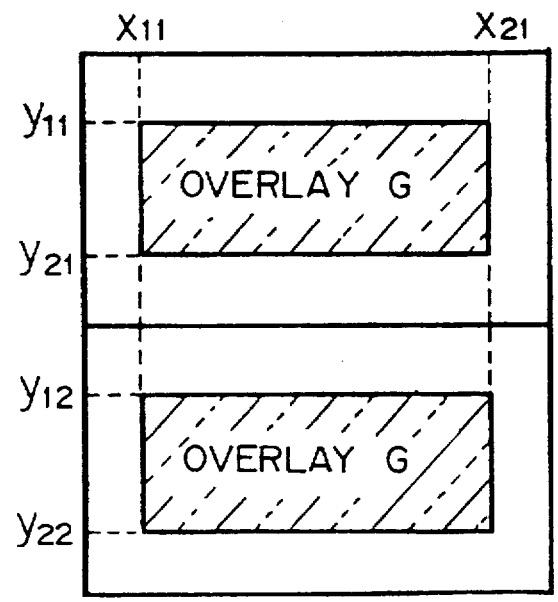
FIGS. 18A and 18B are diagrams for use in explaining the operation of the multiple-frame processing section.
Figure 18B:
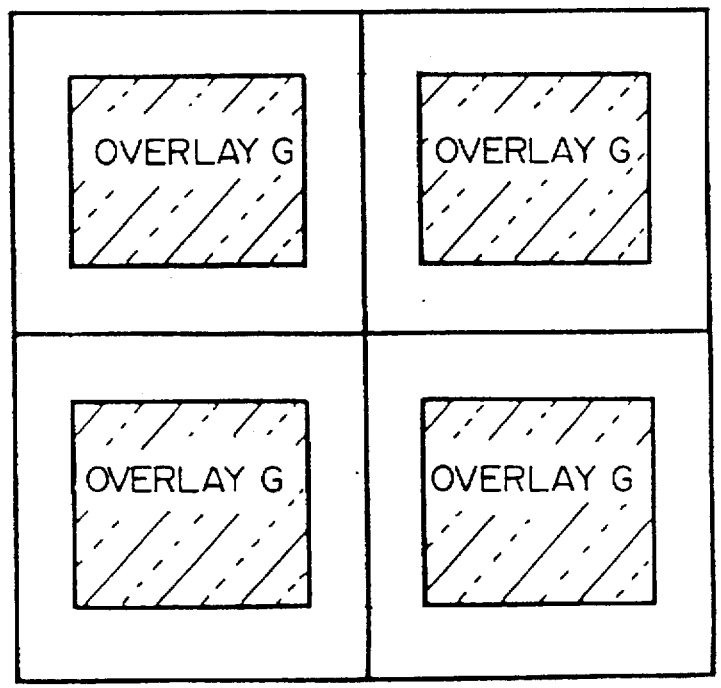

If the overlays to be printed on the respective frames are the same as shown in FIG. 18A or 18B, then it is only required to transfer vector data of one overlay and control record each for a respective one of the two or four frames to the printer section 602, which permits two- or four-frame printing to be made.

Figure 19:
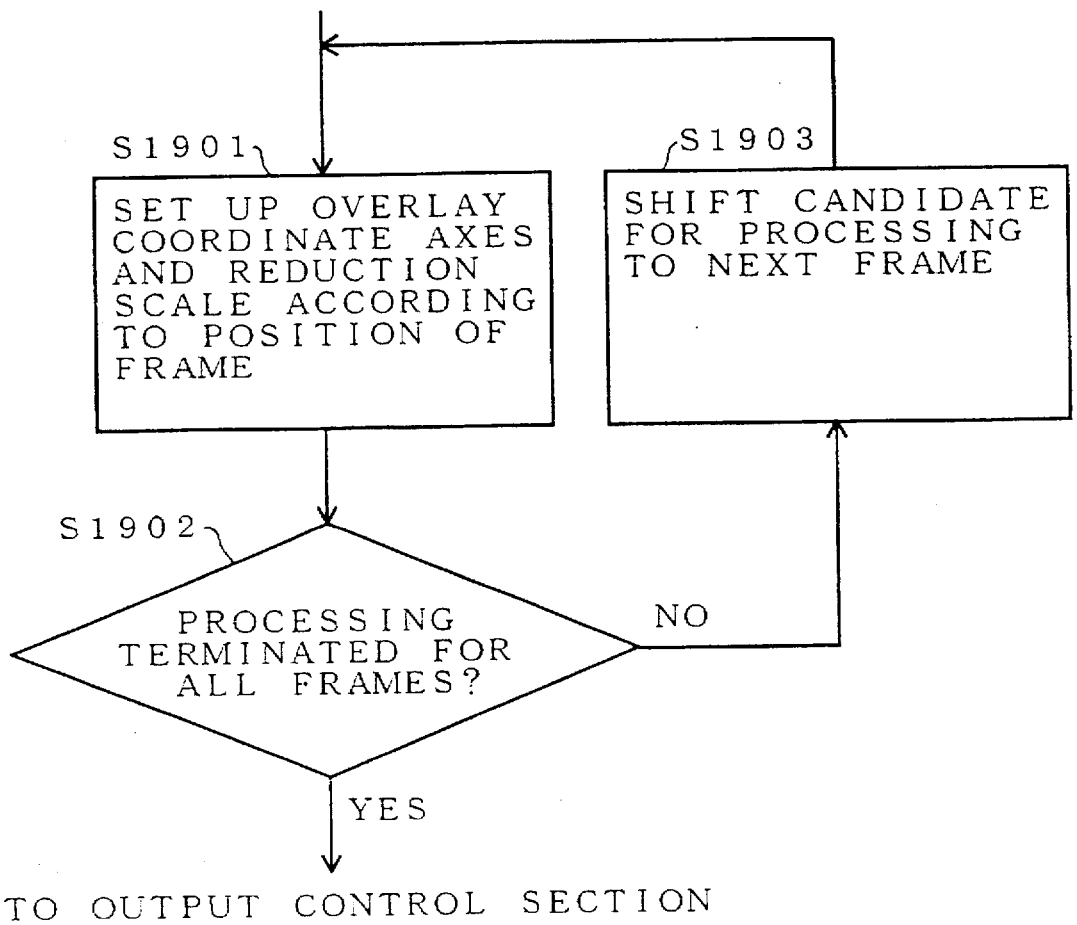
FIG. 19 is a simplified flowchart illustrating the operation of the multiple-frame processing section.

FIG. 19 is a flowchart for the procedure of the multiple-frame processing section 607. Suppose now that an overlay named "G" has been set up within the region defined by the coordinates $(x_1, y_1)$ and $(x_2, y_2)$ as shown in FIG. 7A. When it is desired to print the overlay "G" vertically in two frames within one physical page as shown in FIG. 18A, a related control record is entered into the multiple-frame processing section 607. In step S1901, processing is performed for the upper frame in FIG. 18A. As a result, a control record (overlay G, $x_{11}, y_{11}, x_{21}, y_{21}$, 50) is created from the original control record (overlay G, $x_1, y_1, x_2, y_2$, 100). In subsequent step S1902, a decision is made as to whether the processing has been performed for all of the frames. At present the processing has not been performed yet for the lower frame of FIG. 18A. The procedure thus goes to step S1903 in which a process of shifting a candidate for processing to the lower frame is performed. The procedure next returns to step S1901 in which processing for the lower frame is performed. Consequently, a control record (overlay G, $x_{11}, y_{12}, x_{21}, y_{22}$, 50) is created. In subsequent step S1902, a decision will be made that processing for all the frames has been completed. Then, the control records for the upper and lower frames are sent to the output control section.

Note that it is also possible to set up more than one overlay within each individual frame.

In the above embodiment, to print overlay vector data stored in the overlay memory 610, the print processing section 611 may be arranged to expand the vector data of an overlay stored in the overlay memory in accordance with a control record for that overlay, sent from the application execution section, in which its starting and ending coordinates and enlargement/reduction scale are included. In this case, that control record need not necessarily be stored in the overlay memory 610. Alternatively, the print processing section 611 may be arranged to expand the vector data of an overlay stored in the overlay memory in accordance with a control record for that overlay in which its starting and ending coordinates and enlargement/reduction scale are included and which has been already stored in the overlay memory.

Moreover, the overlay's position indicating information need not be limited to the starting and ending coordinates. Some other position information may be used instead. Furthermore, the enlargement/reduction scale is not essential to the present invention.

In addition, although, in the above embodiment, overlay vector data and associated control records are transferred to the print data memory 609 and the overlay memory 610 at print execution time, this is illustrative and not restrictive. That is, overlay vector data and control records may be transferred to the overlay memory 610 at any time.

According to the present invention, more than one overlay can be placed in any positions on a print page in accordance with overlay position information and overlay scale information. If, therefore, an entire overlay within one print page is represented by a combination of several overlays, each of these overlays can be set up separately and transferred to the printing device.

Moreover, if necessary, it also becomes possible to change the scale of a specific overlay using overlay scale information and transfer it to the printing device in combination with some other overlay.

Furthermore, if overlays have been transferred previously to the printing device, there is no need of transferring overlay data anew to the printing device at print execution time. The printing position and scale for each overlay can be changed simply by transferring new overlay position information and overlay scale information.

In addition, if several overlays differing only partly are to be set up, it is only required to set up a basic overlay and other overlays corresponding to parts that make a difference in shape separately and transfer them to the printing device in sequence. At print execution time, these overlays can be combined appropriately. Thus, since only data for overlays required as parts have only to be transferred from the host device to the printing device, the transfer time can be reduced and moreover the storage capacity of the overlay storage unit can be reduced.

At multiple-frame printing time, overlay position information and overlay scale information which have been changed to meet settings of multiple frames are transferred to the printing device, which permits multiple-frame-based overlay printing to be performed without making any changes to the original overlay data.

In addition, if overlays to be printed on frames are the same, multiple-frame printing is permitted simply by transferring common overlay data and control records for the respective frames to the printing device.

What is claimed is:

1. A multiple-overlay printing device for printing both overlay data and general print data other than said overlay data onto a sheet of paper in accordance with a control by a host device, comprising:

overlay storage means, located within said multiple-overlay printing device, for storing said overlay data which has been previously produced and stored in an overlay memory in said host device and which indicates printing elements of at least one overlay and overlay position information indicating printing position of said at least one overlay so that said overlay data is transferred from said overlay memory in said host device to said overlay storage means in said printing device only once and is not retransferred to said printing device for each print application to thereby reduce printing time; and print processing means for dually functioning to independently expand said general print data and said overlay data which is stored in said overlay storage means and which corresponds to said at least one overlay specified by said host device in accordance with said overlay position information stored in said overlay storage means and to print, onto said sheet of paper, both said expanded overlay data and said general print data so that a printed figure comprises a combination of said at least one overlay and said general print data.

2. The multiple-overlay printing device according to claim 1, wherein said overlay data is vector data indicating [the]coordinates of end points of line elements which are printing elements [of a]corresponding to said at least one overlay.

3. A multiple-overlay printing device for printing both overlay data and general print data other than said overlay data onto a sheet of paper in accordance with a control by a host device, comprising:

overlay storage means, located within said multiple-overlay printing device, for storing said overlay data which has been previously produced and stored in an overlay memory in said host device and which indicates printing elements of at least one overlay so that said overlay data is transferred from said overlay memory in said host device to said overlay storage means in said printing device only once and is not retransferred to said printing device for each print application to thereby reduce printing time; and print processing means for dually functioning to independently expand said general print data and said overlay data which is stored in said overlay storage means and which corresponds to said at least one overlay specified by said host device in accordance with overlay position information specified by said host device and to print, onto said sheet of paper, both said expanded overlay data and said general print data so that a printed figure comprises a combination of said at least one overlay and said general print data.

4. A multiple-overlay printing device for printing both overlay data and general print data other than said overlay data both onto a display screen and onto a sheet of paper in accordance with a control by a host device, comprising:

overlay storage means, located within said multiple-overlay printing device, for storing said overlay data which has been previously produced and stored in an overlay memory in said host device and which indicates printing elements of at least one overlay, overlay position information indicating printing position of said at least one overlay and overlay scale information indicating scale of said at least one overlay so that said overlay data is transferred from said overlay memory in said host device to said overlay storage means in said printing device only once and is not retransferred to said printing device for each print application to thereby reduce printing time; and print processing means for dually functioning to independently expand said general print data and said overlay data which is stored in said overlay storage means and which corresponds to said at least one overlay specified by said host device in accordance with said overlay position information and said overlay scale information stored in said overlay storage means and to print, onto said sheet of paper, both said expanded overlay data and said general print data so that a printed figure comprises a combination of said at least one overlay and said general print data.

5. A multiple-overlay printing device for printing both overlay data and general print data other than said overlay data onto a sheet of paper in accordance with a control by a host device, comprising:

overlay storage means, located within said multiple-overlay printing device, for storing said overlay data which has been previously produced and stored in an overlay memory in said host device and which indicates printing elements of at least one overlay so that said overlay data is transferred from said overlay memory in said host device to said overlay storage means in said printing device only once and is not retransferred to said printing device for each print application to thereby reduce printing time; and print processing means for dually functioning to independently expand said general print data and said overlay data which is stored in said overlay storage means and which corresponds to said at least one overlay specified by said host device in accordance with overlay position information indicating a printing position of said at least one overlay and overlay scale information indicating a scale of said at least one overlay specified by said host device and to print, onto said sheet of paper, both said expanded overlay data and said general print data so that a printed figure comprises a combination of said at least one overlay and said general print data.

6. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means;

said overlay set-up means for setting up said overlay data indicating printing elements of at least one overlay directly to said output control means and overlay position information indicating a printing position of said at least one overlay directly to a multiple-frame processing unit;

said output control means for outputting said overlay data from said overlay set-up means and overlay position information from said overlay set-up means via said multiple-frame processing unit for said at least one overlay set up by said overlay set-up means as said signals and outputting said general print data separately from said overlay data and said overlay position information; and overlay specifying means for, at print execution time, outputting said signals to a print processing unit of said printing device to specify said at least one overlay to be printed for each print page onto a sheet of paper.

7. The multiple-overlay outputting device according to claim 6, wherein said overlay data is vector data indicating coordinates of end points of line elements which are printing elements corresponding to said at least one overlay.

8. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means and overlay position information indicating printing position of said at least one overlay directly to a multiple-frame processing unit;

said output control means for outputting said overlay data from said overlay set-up means and said overlay position information from said overlay set-up means via said multiple-frame processing unit for said at least one overlay set up by said overlay set-up means as said signals and outputting said general print data separately from said overlay data and said overlay position information; and overlay specifying means for, at print execution time, outputting said signals to said print processing unit of said printing device to specify said at least one overlay to be printed and said overlay position information for each print page onto a sheet of paper.

9. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means, overlay position information indicating printing position of said at least one overlay directly to a multiple-frame processing unit, and overlay scale information indicating scale of said at least one overlay directly to said multiple-frame processing unit;

said output control means for outputting said overlay data from said overlay set-up means and both said overlay position information and said overlay scale information from said overlay set-up means via said multiple-frame processing unit for said at least one overlay set up by said overlay set-up means as said signals and outputting said general print data separately from said overlay data and said overlay position information; and overlay specifying means for, at print execution time, outputting said signals to said print processing unit of said printing device to specify said at least one overlay to be printed for each print page onto a sheet of paper.

10. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means, overlay position information indicating printing position of said at least one overlay directly to a multiple-frame processing unit, and overlay scale information indicating scale of said at least one overlay directly to said multiple-frame processing unit;

said output control means for outputting said overlay data from said overlay set-up means and both said overlay position information and said overlay scale information from said overlay set-up means via said multiple-frame processing unit for said at least one overlay set up by said overlay set-up means as said signals and outputting said general print data separately from said overlay data and said overlay position information; and overlay specifying means for, at print execution time, outputting said signals to said print processing unit of said printing device to specify said at least one overlay to be printed, both said overlay position information and said overlay scale information set up by said overlay set-up means for each print page onto a sheet of paper.

11. The multiple-overlay printing system having a host device and a printing device for printing, onto a sheet of paper, both overlay data and general print data other than said overlay data, said host device comprising:

general print data producing means for producing general print data other than said overlay data, and sending said general print data to an output control means:

overlay set-up means for setting up said overlay data indicating printing elements of at least one overlay directly to said output control means and overlay position information indicating a printing position of said at least one overlay directly to a multiple-frame processing unit;

said output control means for transferring said overlay data from said overlay set-up means and said overlay position information from said overlay set-up means via said multiple-frame processing unit for said at least one overlay set up by said overlay set-up means and outputting said general print data separately from said overlay data and said overlay position information to said printing device; and overlay specifying means for, at print execution time, specifying said at least one overlay to be printed to said print processing means of said printing device for each print page, and said printing device comprising:
 overlay storage means for storing said overlay data and said overlay position information transferred by said output control means; and
 said print processing means for dually functioning to independently expand said general print data and said overlay data which is stored in said overlay storage means and which corresponds to said at least one overlay specified by said overlay position information stored in said overlay storage means and to print, onto said sheet of paper, both said expanded overlay data and said general print data so that a printed figure comprises a combination of said at least one overlay and said general print data.

12. The multiple-overlay printing system according to claim 11, wherein said overlay data is vector data indicating coordinates of end points of line elements which are printing elements corresponding to said at least one overlay.

13. A multiple-overlay printing system having a host device and a printing device for printing, onto a sheet of paper, both overlay data and general print data other than said overlay data, said host device comprising:
 general print data producing means for producing general print data other than said overlay data, and sending said general print data to an output control means:
 overlay set-up means for setting up said overlay data indicating printing elements of at least one or more overlay directly to said output control means and overlay position information indicating a printing position of said at least one overlay directly to a multiple-frame processing unit;
 said output control means for tranferring said overlay data from said overlay set-up means and said overlay position information from said overlay set-up means via said multiple-frame processing unit for each of said at least one overlay set up by said overlay set-up means and outputting said general print data separately from said overlay data and said overlay position information to said printing device; and
 overlay specifying means for, at print execution time, specifying said at least one overlay to be printed and said overlay position information set up by said overlay set-up means to a print processing means of said printing device for each print page, and said printing device comprising:
 overlay storage means for storing said overlay data and said overlay position information transferred by said output control means; and
 said print processing means for dually functioning to independently expand said general print data and said overlay data which is stored in said overlay storage means and which corresponds to said at least one overlay specified by said overlay specifying means in accordance with said overlay position information specified by said overlay specifying mean and to print, onto said sheet of paper, both said expanded overlay data and said general print data so that a printed figure comprises a combination of said at least one overlay and said general print data.

14. A multiple-overlay printing system having a host device and a printing device for printing, onto a sheet of paper, both overlay data and general print data other than said overlay data, said host device comprising:
 general print data producing means for producing general print data other than said overlay data, and sending said general print data to an output control means:
 overlay set-up means for setting up said overlay data indicating printing elements of at least one overlay directly to said output control means, overlay position information indicating a printing position of said at least one overlay directly to a multiple-frame processing unit, and overlay scale information indicating a scale of said at least one overlay directly to said multiple-frame processing unit;
 said output control means for tranferring said overlay data from said overlay set-up means, both said overlay position information and said overlay scale information from said overlay set-up means via said multiple-frame processing unit for said at least one overlay set up by said overlay set-up means and outputting said general print data separately from said overlay data, said overlay position information and said overlay scale information to said printing device; and
 overlay specifying means for, at print execution time, specifying said at least one overlay to be printed to a print processing means of said printing device for each print page, and said printing device comprising:
 overlay storage means for storing said overlay data and said overlay position information and said overlay scale information for said at least one overlay transferred by said output control means; and
 said print processing means for dually functioning to independently expand said general print data and said overlay data which is stored in said overlay storage means and which corresponds to said at least one overlay specified by said overlay specifying means in accordance with said overlay position information and said overlay scale information stored in said overlay storage means and to print, onto said sheet of paper, both said expanded overlay data and said general print data so that a printed figure comprises a combination of said at least one overlay and said general print data.

15. A multiple-overlay printing system having a host device and a printing device for printing both overlay data and general print data other than said overlay data, said host device comprising:
 general print data producing means for producing general print data other than said overlay data, and sending said general print data to an output control means:
 overlay set-up means for setting up said overlay data indicating printing elements of at least one overlay directly to said output control means, overlay position information indicating a printing position of said at least one overlay directly to a multiple-frame processing unit, and overlay scale information indicating a scale of said at least one overlay directly to said multiple-frame processing unit;
 said output control means for tranferring said overlay data from said overlay set-up means, both said overlay position information and said overlay scale information from said overlay set-up means via said multiple-frame processing unit for said at least one overlay set up by said overlay set-up means and outputting said general print data separately from said overlay data, said overlay position information and said overlay scale information to said printing device; and overlay specifying means for, at print execution time, specifying said at least one overlay to be printed, said overlay position information and said overlay scale information set up by said overlay set-up means to a print processing means of said printing device for each print page, and said printing device comprising:

overlay storage means for storing said overlay data, said overlay position information and said overlay scale information for said at least one overlay transferred by said output control means; and said print processing means for dually functioning to independently expand said general print data and said overlay data which is stored in said overlay storage means and which corresponds to said at least one overlay specified by said overlay specifying means in accordance with said overlay position information and said overlay scale information specified by said overlay specifying means and to print, onto a sheet of paper, both said expanded overlay data and said general print data so that a printed figure comprises a combination of said at least one overlay and said general print data.

16. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means and overlay position information indicating a printing position of said at least one overlay directly to a multiple-frame processing unit;

said multiple-frame processing means for translating said overlay position information for said at least one overlay set up by said overlay set-up means, after a multiple-frame setting has been set up in accordance with how to split a print page into said multiple-frame settings;

said output control means for outputting said overlay data from said overlay set-up means and overlay position information from said overlay set-up means via said multiple-frame processing unit for said at least one overlay set up by said overlay set-up means and said overlay position information translated by said multiple-frame processing means as said signals and outputting said general print data separately from said overlay data and said overlay position information; and overlay specifying means for, at print execution time, outputting said signals to a print processing unit of said printing device to specify said at least one overlay to be printed for each said print page.

17. The multiple-overlay outputting device according to claim 16, wherein said overlay data is vector data indicating coordinates of end points of line elements which are printing elements corresponding to said overlay.

18. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means and overlay position information indicating a printing position of said at least one overlay directly to a multiple-frame processing unit;

said multiple-frame processing means for translating said overlay position information for said at least one overlay set up by said overlay set-up means, after a mutiple-frame setting has been set up in accordance with how to split a print page into said multiple-frame settings;

said output control means for outputting said overlay data from said overlay set-up means and said overlay position information from said overlay set-up means via said multiple-frame processing unit for said at least one overlay set up by said overlay set-up means and said overlay position information translated by said multiple-frame processing means as said signals and outputting said general print data separately from said overlay data and said overlay position information; and said overlay specifying means for, at print execution time, outputting said signals to a print processing means of said printing device to specify said at least one overlay to be printed and said overlay position information translated by said multiple-frame processing means for each said print page.

19. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data and sending said general print data to an output control means:

said overlay set-up means for setting up said overlay data indicating printing elements of at least one overlay directly to said output control means, overlay position information indicating a printing position of said at least one overlay directly to a multiple-frame processing means, and overlay scale information indicating a scale of said at least one overlay directly to said multiple-frame processing means;

said multiple-frame processing means for translating said overlay position information and said overlay scale information for said at least one overlay set up by said overlay set-up means, after a mutiple-frame setting has been set up in accordance with how to split a print page into said multiple-frame settings;

said output control means for outputting said overlay data from said overlay set-up means and said overlay position information from said overlay set-up means via said multiple-frame processing unit for said at least one overlay set up by said overlay set-up means and corresponding both said overlay position information and said overlay scale information translated by said multiple-frame processing means as said signals and outputting said general print data separately from said overlay data, said overlay position information and said overlay scale information to said printing device; and overlay specifying means for, at print execution time, outputting said signals to a print processing means of said printing device to specify said at least one overlay to be printed for each said print page.

20. A multiple-overlay outputting device for outputting signals from an overlay set-up means in said outputting device to an overlay storage means in a printing device so that overlay data is transferred from an overlay memory in said outputting device to said overlay storage means in said printing device only once without having to be retransferred to said printing device for each print application to thereby reduce printing time, said outputting device comprising:

general print data producing means for producing general print data other than said overlay data, and sending said general print data to an output control means:

said overlay set-up means for setting up said overlay data indicating printing elements of at least one overlay directly to said output control means, overlay position information indicating a printing position of said at least one overlay directly to a multiple-frame processing means, and overlay scale information indicating a scale of said at least one overlay directly to said multiple-frame processing means;

said multiple-frame processing means for translating both said overlay position information and said overlay scale information for said at least one overlay set up by said overlay set-up means, after a mutiple-frame setting has been set up in accordance with how to split a print page into said multiple-frame settings;

said output control means for outputting said overlay data from said overlay set-up means for said at least one overlay set up by said overlay set-up means and both said overlay position information and said overlay scale information from said overlay set-up means translated by said multiple-frame processing means as said signals and outputting said general print data separately from said overlay data, said overlay position information and said overlay scale information; and overlay specifying means for, at print execution time, outputting said signals to a print processing means of said printing device to specify said at least one overlay to be printed and both said overlay position information and said overlay scale information translated by said multiple-frame processing means for each said print page.

21. A multiple-overlay printing system having a host device and a printing device for printing both overlay data and general print data other than said overlay data, said host device comprising:

general print data producing means for producing general print data other than said overlay data, and sending said general print data to an output control means:

overlay set-up means for setting up said overlay data indicating printing elements of at least one overlay directly to said output control means and overlay position information indicating a printing position of said at least one overlay directly to a multiple-frame processing means;

said multiple-frame processing means for translating said overlay position information for said at least one overlay set up by said overlay set-up means, after a mutiple-frame setting has been set up in accordance with how to split a print page into said multiple-frame settings;

said output control means for transferring said overlay data from said overlay set-up means for said at least one overlay set up by said overlay set-up means and said overlay position information from said overlay set-up means translated by said multiple-frame processing means to said printing device and outputting said general print data separately from said overlay data and said overlay position information; and overlay specifying means for, at print execution time, specifying said at least one overlay to be sent to a print processing means of said printing device to be printed by said printing device for each print page, and said printing device comprising:

overlay storage means for storing said overlay data and said overlay position information transferred by said output control means; and said print processing means for dually functioning to independently expand said general print data and said overlay data which is stored in said overlay storage means and which corresponds to said at least one overlay specified by said overlay specifying means in accordance with said overlay position information stored in said overlay storage means and to print, onto a sheet of paper, both said expanded overlay data and said general print data so that a printed figure comprises a combination of said at least one overlay and said general print data.

22. The multiple-overlay printing system according to claim 21, wherein said overlay data is vector data indicating coordinates of end points of line elements which are printing elements corresponding to said at least one overlay.

23. A multiple-overlay printing system having a host device and a printing device for printing, onto a sheet of paper, overlay data and general print data other than said overlay data, said host device comprising:

general print data producing means for producing general print data other than said overlay data, and sending said general print data to an output control means:

overlay set-up means for setting up said overlay data indicating printing elements of at least one overlay and overlay position information indicating a printing position of said at least one overlay;

multiple-frame processing means for translating said overlay position information for said at least one overlay set up by said overlay set-up means, after a mutiple-frame setting has been set up in accordance with how to split a print page into said multiple-frame settings;

said output control means for transferring said overlay data for said at least one overlay set up by said overlay set-up means and said overlay position information translated by said multiple-frame processing means to said printing device and outputting said general print data separately from said overlay data and said overlay position information; and overlay specifying means for, at print execution time, specifying said at least one overlay to be printed and said overlay position information translated by said multiple-frame processing means to said printing device for each print page, and said printing device comprising:

overlay storage means for storing said overlay data and said overlay position information transferred by said output control means; and print processing means for dually functioning to independently expand said general print data and said overlay data which is stored in said overlay storage means and which corresponds to said at least one overlay specified by said overlay specifying means in accordance with said overlay position information specified by said overlay specifying means and to print, onto said sheet of paper, both said expanded overlay data and said general print data so that a printed figure comprises a combination of said at least one overlay and said general print data.

24. A multiple-overlay printing system having a host device and a printing device for printing, onto a sheet of paper, both overlay data and general print data other than said overlay data, said host device comprising:

general print data producing means for producing general print data other than said overlay data, and sending said general print data to an output control means:

overlay set-up means for setting up said overlay data indicating printing elements of at least one overlay, overlay position information indicating a printing position of said at least one overlay, and overlay scale information indicating a scale of said at least one overlay;

multiple-frame processing means for translating said overlay position information for said at least one overlay set up by said overlay set-up means, after a mutiple-frame setting has been set up in accordance with how to split a print page into said multiple-frame settings;

said output control means for transferring said overlay data for said at least one overlay set up by said overlay set-up means and both said overlay position information and said overlay scale information translated by said multiple-frame processing means to said printing device and outputting said general print data separately from said overlay data, said overlay position information and said overlay scale information; and overlay specifying means for, at print execution time, specifying said at least one overlay to be printed to said printing device for each print page, and said printing device comprising:

overlay storage means for storing said overlay data, said overlay position information and said overlay scale information transferred by said output control means; and print processing means for dually functioning to independently expand said general print data and said overlay data which is stored in said overlay storage means and which corresponds to said at least one overlay specified by said overlay specifying means in accordance with said overlay position information and said overlay scale information in said overlay storage means and to print, onto said sheet of paper, both said expanded overlay data and said general print data so that a printed figure comprises a combination of said at least one overlay and said general print data.

25. A multiple-overlay printing system having a host device and a printing device for printing, onto a sheet of paper, both overlay data and general print data other than said overlay data, said host device comprising:

general print data producing means for producing general print data other than said overlay data, and sending said general print data to an output control means:

overlay set-up means for setting up said overlay data indicating printing elements of at least one overlay, overlay position information indicating a printing position of said at least one overlay, and overlay scale information indicating a scale of said at least one overlay;

multiple-frame processing means for translating both said overlay position information and said overlay scale information for said at least one overlay set up by said overlay set-up means, after a mutiple-frame setting has been set up in accordance with how to split a print page into said multiple-frame settings;

said output control means for transferring said overlay data for at least one overlay set up by said overlay set-up means, said overlay position information and said overlay scale information translated by said multiple-frame processing means to said printing device and outputting said general print data separately from said overlay data, said overlay position information and said overlay scale information; and overlay specifying means for, at print execution time, specifying said at least one overlay to be printed and, said overlay position information and said overlay scale information translated by said multiple-frame processing means to said printing device for each print page, and said printing device comprising:

overlay storage means for storing said overlay data, said overlay position information and said overlay scale information transferred by said output control means; and print processing means for dually functioning to independently expand said general print data and said overlay data which is stored in said overlay storage means and which corresponds to said at least one overlay specified by said overlay specifying means in accordance with said overlay position information and said overlay scale information specified by said overlay specifying means and to print, onto said sheet of paper, both said expanded overlay data and said general print data so that a printed figure comprises a combination of said at least one overlay and said general print data.

* * * * *